(12) United States Patent
Desai et al.

(10) Patent No.: US 10,078,627 B2
(45) Date of Patent: Sep. 18, 2018

(54) COLLABORATION CARDS FOR COMMUNICATION RELATED TO A COLLABORATED DOCUMENT

(71) Applicant: MICROSOFT TECHNOLOGY LICENSING, LLC, Redmond, WA (US)

(72) Inventors: Shikha Desai, Redmond, WA (US); Gary Caldwell, Seattle, WA (US); Rolf Ebeling, Kirkland, WA (US); Taili Feng, Bellevue, WA (US); Paul Scudieri, Seattle, WA (US); Sung Joon Won, Seattle, WA (US); Eugene Y. Suh, Redmond, WA (US); Ruth Kikin-Gil, Redmond, WA (US); Patrick Davis, Seattle, WA (US); Derik Stenerson, Redmond, WA (US); Suzan Marashi, Redmond, WA (US); Navneet Kambo, Redmond, WA (US); Zachary Burstain, Seattle, WA (US); Erin O'Connell, Cambridge, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 332 days.

(21) Appl. No.: 14/946,799

(22) Filed: Nov. 20, 2015

(65) Prior Publication Data

US 2017/0147547 A1    May 25, 2017

(51) Int. Cl.
*G06F 3/0484*    (2013.01)
*G06F 17/24*    (2006.01)
(Continued)

(52) U.S. Cl.
CPC ........ *G06F 17/241* (2013.01); *G06F 3/04842* (2013.01); *G06Q 10/10* (2013.01);
(Continued)

(58) Field of Classification Search
CPC ....................................................... G06F 17/24
See application file for complete search history.

(56) References Cited

U.S. PATENT DOCUMENTS 7,818,678 B2    10/2010    Massand
8,250,141 B2    8/2012    Xiao et al.
(Continued)

OTHER PUBLICATIONS

"Quip: Docs, Chat, Spreadsheets", Published on: Oct. 11, 2014 Available at: https://play.google.com/store/apps/details?id=com.quip.quip.

(Continued)

*Primary Examiner* — David Choi

(57) ABSTRACT

Collaboration cards are provided to enable people to collaborate and receive instant replies to comments or questions from anywhere in a collaboratively generated document. A collaborator may add somebody's name to a collaboration card and ask that person for information, for example. That person may receive the question/comment via an email, a text message, a posting, or comparable communication methods, and respond back with the requested information through the same communication channel or another communication channel. The replied content may be placed into the collaboration card created in the document, and the original sender may be enabled to accept a change to the document content based on the collaboration card.

17 Claims, 9 Drawing Sheets

(51) Int. Cl.
  *H04L 29/06* (2006.01)
  *H04L 12/58* (2006.01)
  *H04L 29/08* (2006.01)
  *G06Q 10/10* (2012.01)

(52) U.S. Cl.
  CPC .............. *H04L 51/04* (2013.01); *H04L 51/22* (2013.01); *H04L 65/403* (2013.01); *H04L 67/10* (2013.01)

(56) References Cited

U.S. PATENT DOCUMENTS

| | | |
|---|---|---|
| 8,943,417 B2 | 1/2015 | Parker et al. |
| 9,053,079 B2 | 6/2015 | Bailor et al. |
| 9,064,237 B2 | 6/2015 | Simons et al. |
| 2004/0085354 A1* | 5/2004 | Massand ............ G06F 17/2229 715/751 |
| 2006/0282762 A1 | 12/2006 | Diamond et al. |
| 2010/0005398 A1 | 1/2010 | Pratley et al. |
| 2010/0241968 A1 | 9/2010 | Tarara et al. |
| 2012/0284618 A1 | 11/2012 | Bailor et al. |
| 2013/0055233 A1* | 2/2013 | Hatton ..................... G06F 8/71 717/170 |
| 2013/0091419 A1 | 4/2013 | Caliman et al. |
| 2013/0159830 A1 | 6/2013 | Lee et al. |
| 2014/0047330 A1 | 2/2014 | Yan |
| 2014/0195885 A1 | 7/2014 | Thiruvidam et al. |
| 2014/0289645 A1 | 9/2014 | Megiddo et al. |
| 2014/0310345 A1 | 10/2014 | Megiddo et al. |
| 2014/0310613 A1 | 10/2014 | Megiddo et al. |
| 2015/0113390 A1* | 4/2015 | Vagell ..................... G06F 17/24 715/255 |
| 2015/0358658 A1* | 12/2015 | Murphy ........... H04N 21/25883 725/35 |
| 2016/0048275 A1* | 2/2016 | Beavers ................ G06F 3/0483 715/202 |
| 2016/0260130 A1* | 9/2016 | Chand ................ G06Q 30/0256 |
| 2017/0147547 A1* | 5/2017 | Desai .................... G06F 17/241 |

OTHER PUBLICATIONS

"International Search Report and Written Opinion Issued in PCT Patent Application No. PCT/US2016/061944", dated Jan. 25, 2017, 10 Pages.

* cited by examiner

COLLABORATION CARDS FOR COMMUNICATION RELATED TO A COLLABORATED DOCUMENT

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to productivity tools. Many such applications help authoring of content. Communications between collaborators of a document may be dispersed across multiple applications. Today, it is difficult to access all the communication around a document in one place.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to facilitating collaboration and communication related to a collaborative document through collaboration cards. In some examples, as document may be presented through a user interface of a document authoring application. Upon detecting an action for commenting on a portion of content within the document, an option to share a comment with a collaborator may be displayed along with one or more options to select a communication channel to share the comment. The comment may be shared with the collaborator through the selected communication channel in form of a collaboration card. Upon receiving a reply to the shared comment, the reply and an option to integrate received content into the content within the document may also be displayed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
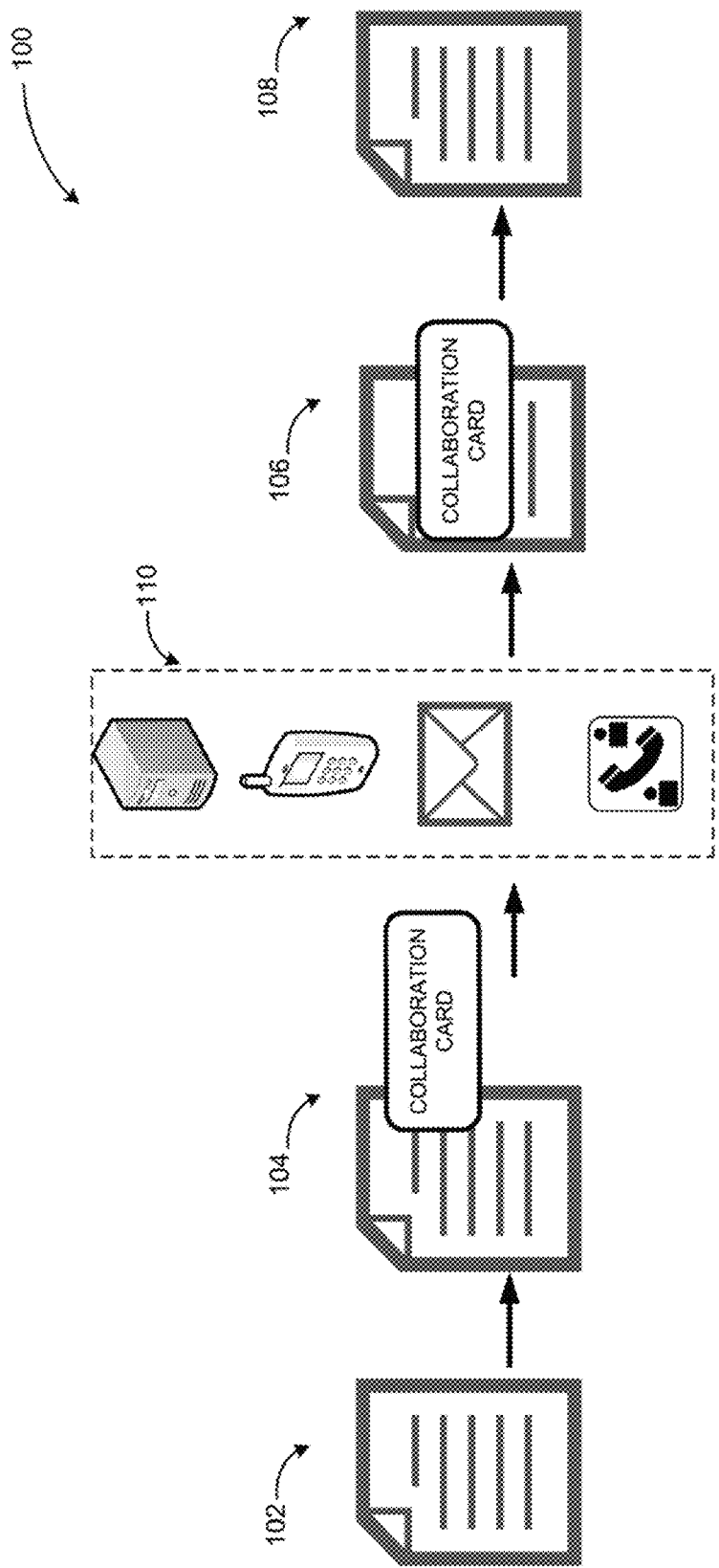
FIG. 1 is a conceptual diagram illustrating an example for providing collaboration cards to communicate in relation to a collaborative document, according to embodiments.

As briefly described above, collaboration cards may be provided to enable people to collaborate and receive instant replies to comments or questions from anywhere in a collaboratively generated document. A collaborator may add somebody's name to a collaboration card and ask that person for information, for example. That person may receive the question/comment via an email, a text message, a posting, or comparable communication methods, and respond back with the requested information through the same communication channel or another communication channel. The replied content may be placed into the collaboration card created in the document, and the original sender may be enabled to accept a change to the document content based on the collaboration card.

In the following detailed description, references are made to the accompanying drawings that form a part hereof, and in which are shown by way of illustrations, specific embodiments, and/or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide collaboration communication tools within a document editor. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, and/or a wearable computer. A memory may be a removable and/or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, and/or similar content. An operating system is a system configured to manage hardware and software components of a computing device that provides common services and applications. An integrated module is a component of an application and/or service that is integrated within the application and/or service such that the application and/or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application and/or service through which a user interacts with the application and/or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application and/or service that enable the application and/or service to interact or communicate with one or more other applications and services managed by separate entities.

FIG. 1 is a conceptual diagram illustrating an example system for providing collaboration cards to communicate in relation to a collaborative document, according to embodiments.

In a diagram 100, a user may be working on a document 102 (for example, creating or editing) in collaboration with others. The user may make change to the document or insert a comment directed to one or more of the collaborators, which may be in form of a collaboration card associated with the document (104). The collaboration card may be forwarded through one or more communication channels 110 (for example, email, text message, online conference, posting, or other means) to other collaborator(s). One or more of the other collaborators may respond with a reply and/or further changes to the document. The response(s) may be aggregated in the collaboration card associated with the document (106). The original user (and other collaborators) may be enabled to view the aggregated responses and or integrate any submitted changes directly to the document resulting in document 108.

In some examples, the original comment change may be initiated from within an application capable of editing the document (for example, a word processing application, a presentation application, a spreadsheet application, and similar ones). The collaboration card may be forwarded to other collaborators through a communication application or other applications. Responses may be provided through the same or different communication applications or the application capable of editing the document ("document authoring application"). The document authoring application may be executed on a tablet device, a laptop computer, a desktop computer, and/or a smart phone, among others. The document authoring application may also be a web application executed on one or more servers and accessed through a web browser.

The collaborators may interact with the document authoring application through a keyboard based input, a mouse based input, a voice based input, a pen based input, and/or a gesture based input, among others. The gesture based input may include one or more touch based actions such as a touch action, a swipe action, and/or a combination of each, among others.

The document authoring application may store the document and/or the collaboration cards locally or in the cloud. For example, the document may be retrieved from a content service hosted by a content server. The content server may include a web server, a document server, among others. The computing device may communicate with the content server through a network. The network may provide wired and/or wireless communications between nodes such as the computing device executing the document authoring application and the communication applications, and/or the content server, among others.

Figure 2:
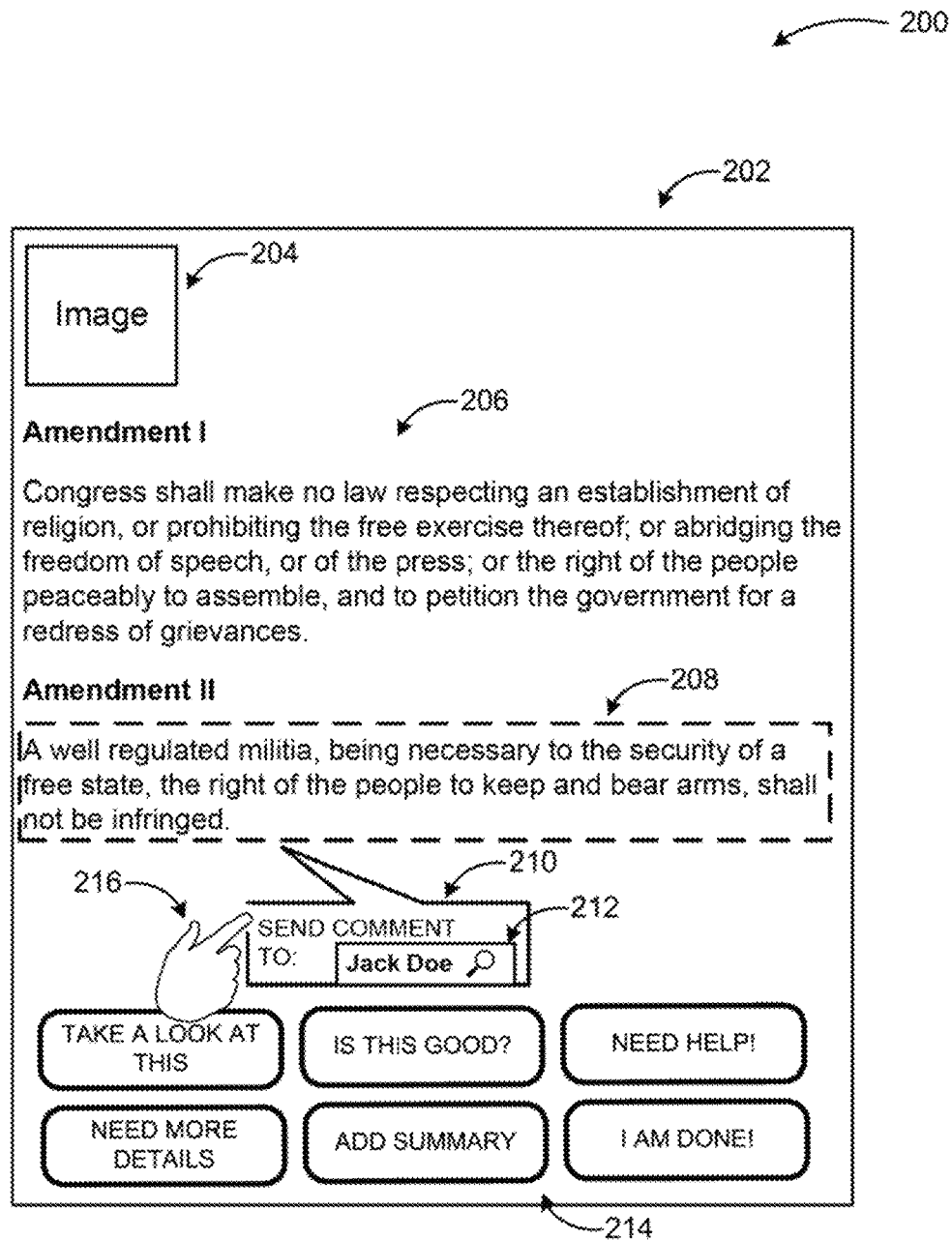
FIG. 2 illustrates presentation of a comment sharing option upon selection of a portion of content in a collaborative document.

FIG. 2 illustrates presentation of a comment sharing option upon selection of a portion of content in a collaborative document.

As mentioned previously, collaborative comment sharing through collaboration cards may be initiated in different ways. Diagram 200 shows one example initiation through comment insertion. A document with content such as an image 204 and textual content 206 may be displayed on a user interface of a document authoring application and content created and edited by one or more users or collaborators. In an example embodiment, a collaborator may select a portion of the content 208, which may trigger a commenting control 210 to be displayed. The commenting control 210 may also be triggered by tracked changes by one of the collaborators. The commenting control 210 may display an element, which upon activation 216 may allow the collaborator to send input comment(s) to another person. For that purpose, the collaborator may type the name of the person, enter an email address, enter a phone number (for texting), or a search box 212 may be displayed to select a recipient. In other embodiments, prepared ("canned") comments 214 may be suggested for selection. Especially in smaller form devices, a collaborator may be enabled to select a comment and a recipient for the comment with a few simple gestures through the use of commenting control 210 and prepared comments 214.

Figure 3:
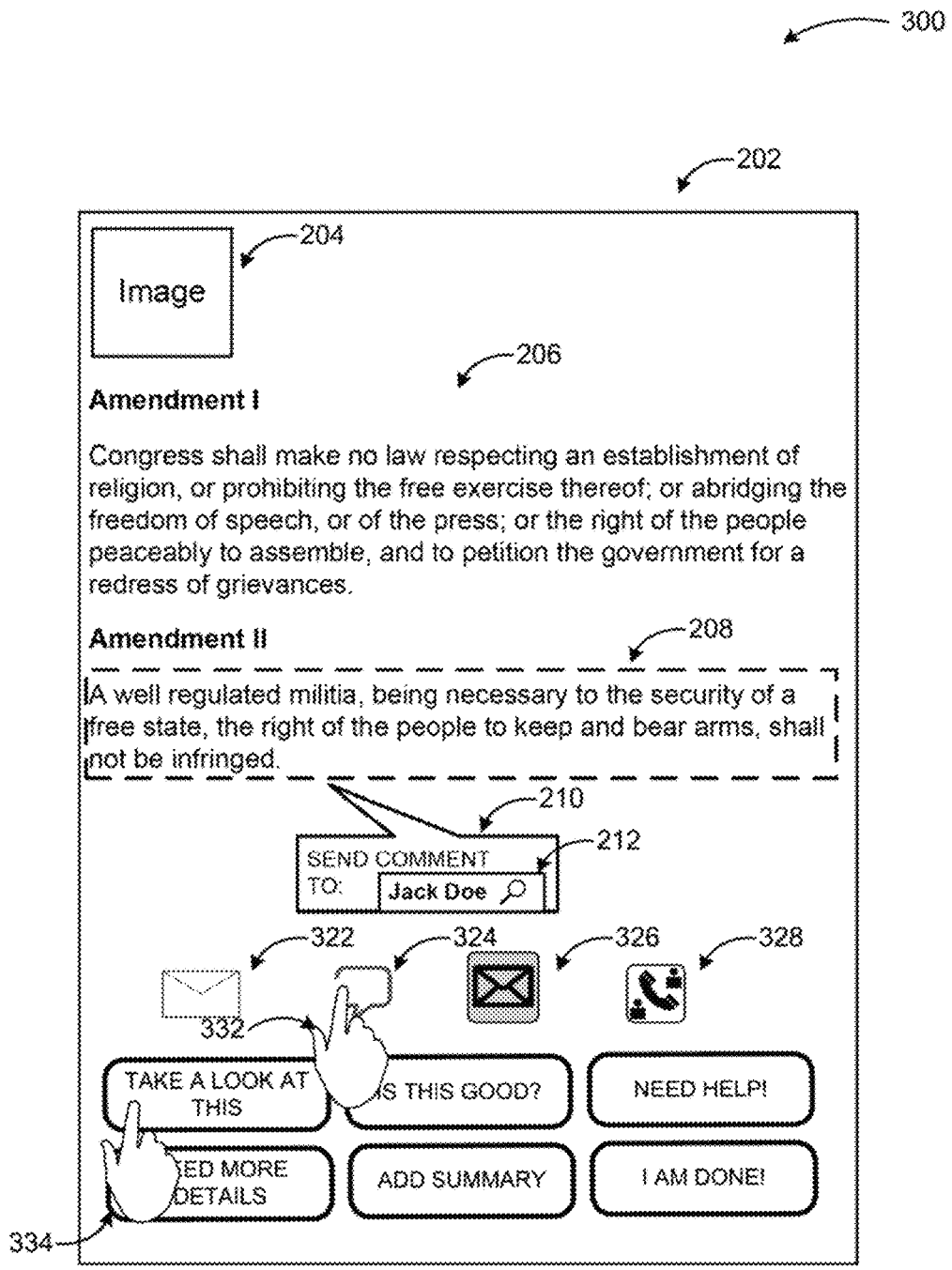
FIG. 3 illustrates presentation of communication channel selection options for comment sharing in a collaborative document.

FIG. 3 illustrates presentation of communication channel selection options for comment sharing in a collaborative document.

Diagram 300 shows a subsequent stage in the comment sharing illustrated in FIG. 2. Upon typing or selecting a recipient's name, the collaborator may be presented with options to select a communication channel such as email 322, text messaging 324, posting 326, or online conferencing 328. Other suitable forms of communication may also be provided. Upon selection 332 of one of the communication channels, the collaborator may select (334) the prepared comment to send to the recipient. The selected comment may be sent to the recipient via the selected communication channel. In some examples, context information such as location of the comment insertion within the document or the selected portion of the content 208 may also be sent in the collaboration card such that the recipient can see not only the comment, but also the context of the comment.

In some examples, an organizational personnel service may also be searched to locate a match for the recipient. In response to locating the recipient in the personnel service, presence information associated with the recipient may be retrieved and provided to the collaborator. Similarly, presence information associated with the collaborator may also be presented to the recipient along with the comment information. The presence information may include a location, and/or a status, among other presence information of the recipient.

Figure 4:
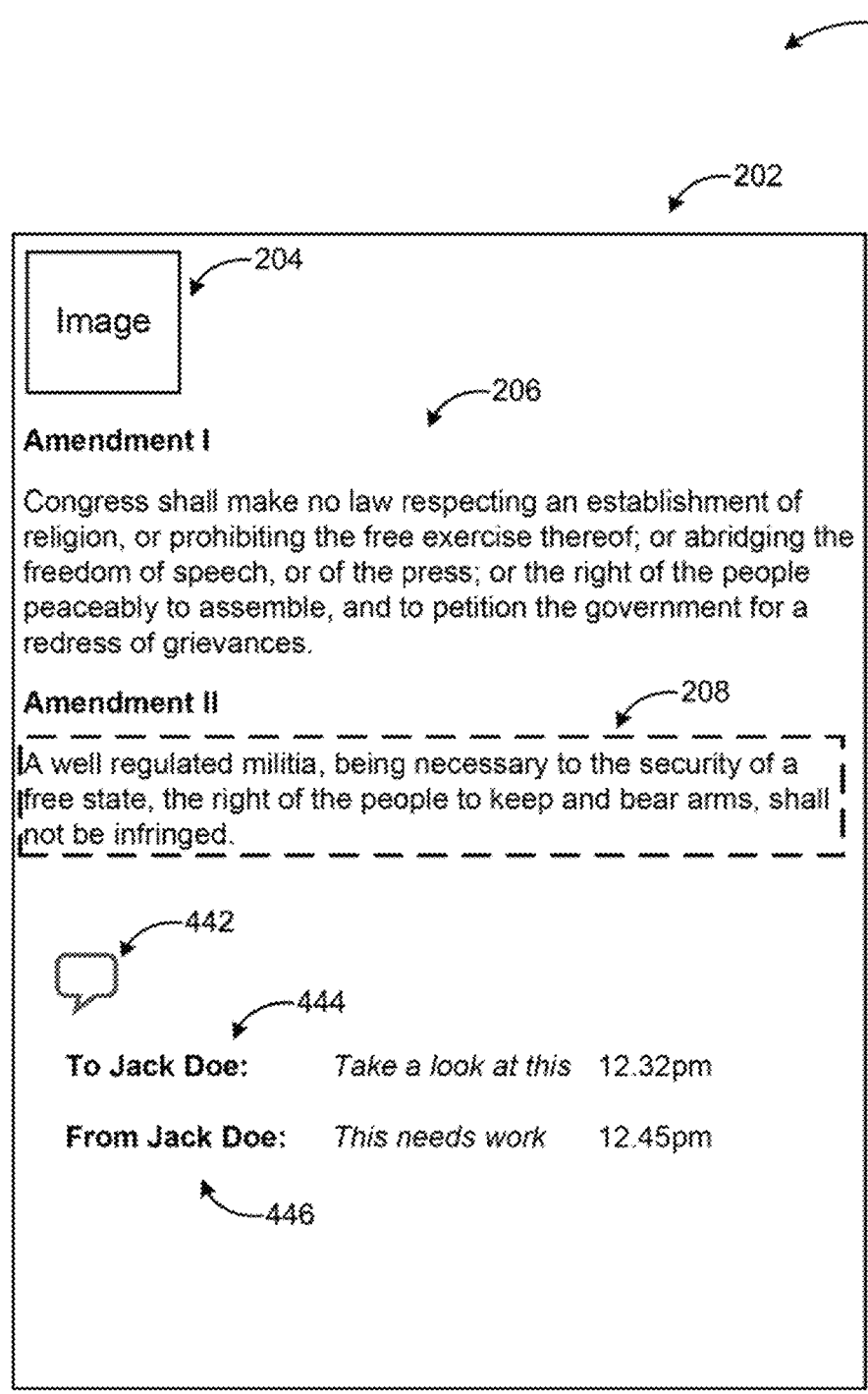
FIG. 4 illustrates presentation shared comments in a collaborative document.

FIG. 4 illustrates presentation of shared comments in a collaborative document.

The shared comment(s) and associated context information may be viewed by the recipient(s) through user interfaces of respective communication applications. The shared comment(s) and associated context information may also be viewed through the user interface of the document authoring application presenting the document. Diagram 400 is an example of the latter scenario, where aggregated comments are shown along with the content of the document. The display of the comment(s) may be in a variety of suitable formats. In the illustrated example, an icon 442 indicates that the comment exchange between the collaborators 444 and 446 was via text messaging. Sender and recipient of each comment, as well as, content and timing of each comment are also displayed. A number of textual, graphic, coloring, shading, and highlighting schemes may be used to optimize conveyance of comment information and context among the collaborators.

Figure 5:
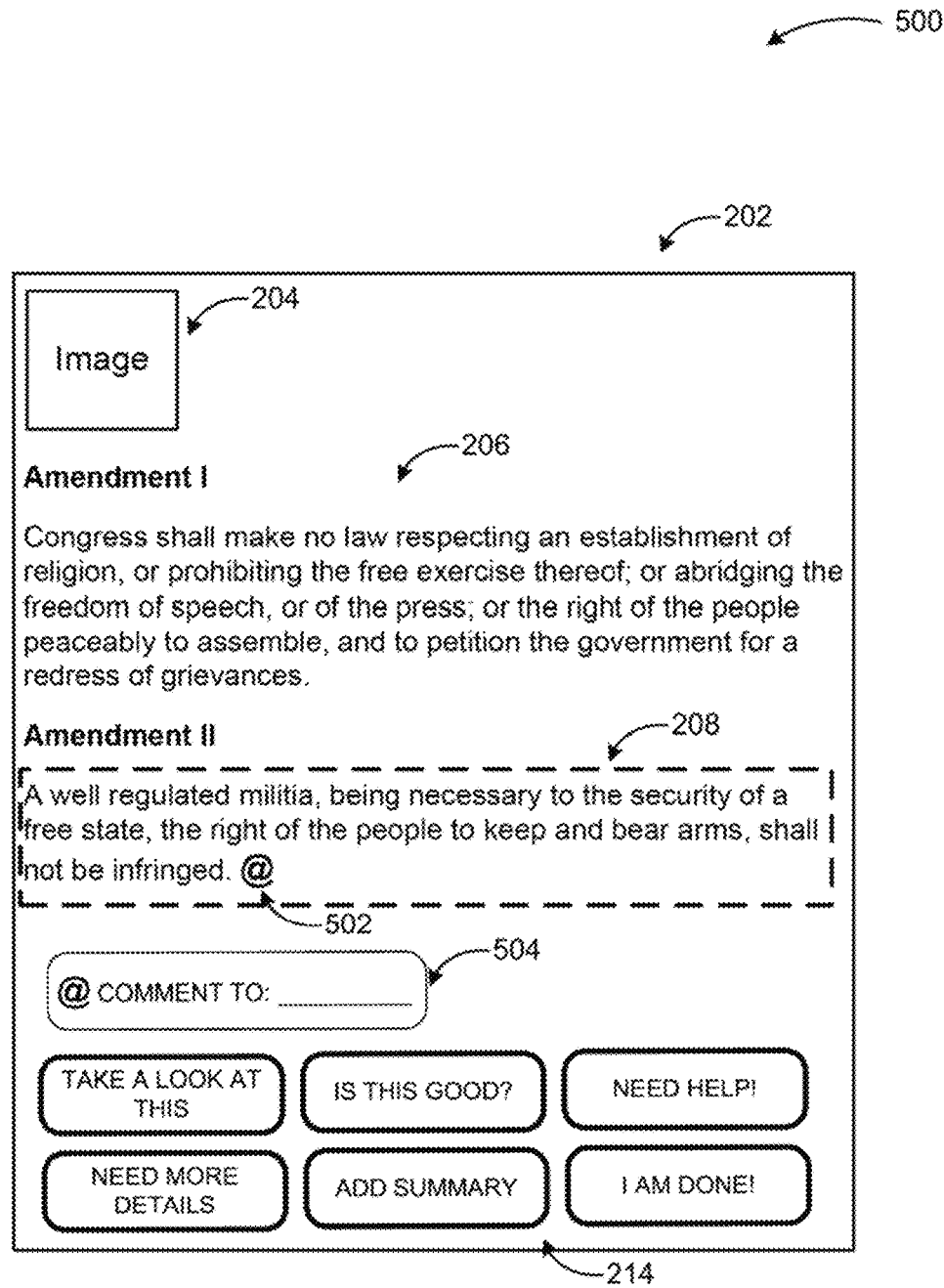
FIG. 5 illustrates presentation of a comment sharing option upon insertion of a commenting tag in a collaborative document.

FIG. 5 illustrates presentation of a comment sharing option upon insertion of a commenting tag in a collaborative document.

As mentioned previously, comment sharing may be initiated through different ways. Diagram 500 shows another example initiation. The collaborator may type a pre-designated special character, such as sign as "@" sign 205, at a location in the content of the document 202, which may trigger comment sharing. A user interface element 504 enabling the collaborator to type or select a name of the recipient may be displayed allowing the collaborator to send the comment to the recipient directly from within the content of the document. In other embodiments, the collaborator may type the special character followed by the name of the recipient and a contact selection user interface may be displayed allowing the collaborator to select an email address, a messaging address (e.g., phone number), etc. for the recipient. The collaborator may then be enabled to type his/her comment or select from the available prepared comments to send.

In the example configuration, where the collaborator may start typing the name of the recipient, a contact list may be checked from local device storage (for example, a smart phone) or an external contacts database. Upon selection of the contact, different contact options may be presented (for example, email address, phone number to text, or any other third party application contact information like a social or professional networking application). The collaborator may also be enabled to assign flags to the collaboration card such as urgent, confidential, or similar ones, and transmit with a gesture or other input.

The collaboration card may be sent to one or more recipients, who may receive a notification through the communication application that was selected by the collaborator. For different recipients, different notification channels may be selected. In an example scenario, upon tapping on a received notification, the recipient may see the message and content through the selected application such as who sent the message, a snippet of content as context to the comment in the collaboration card, and reply options, for example. When the recipient replies to the email or text, the content of the reply may be sent to a collaboration notification service. The notification service may then aggregate the responses and send a notification to the initiating collaborator that there are responses. The initiating collaborator may see the collaboration card get filled in with the responses in the document authoring application. The responses may show conversations as well as suggested content. Depending on which application opens the message, the details of the message and content may be created in the appropriate, format, for example, an HTML block if the message arrives in an email format. The suggested content may be merged with the document content upon confirmation by the initiating collaborator. In some examples, the collaboration card may be left in the document as a comment hint even after merging of the content.

Figure 6:
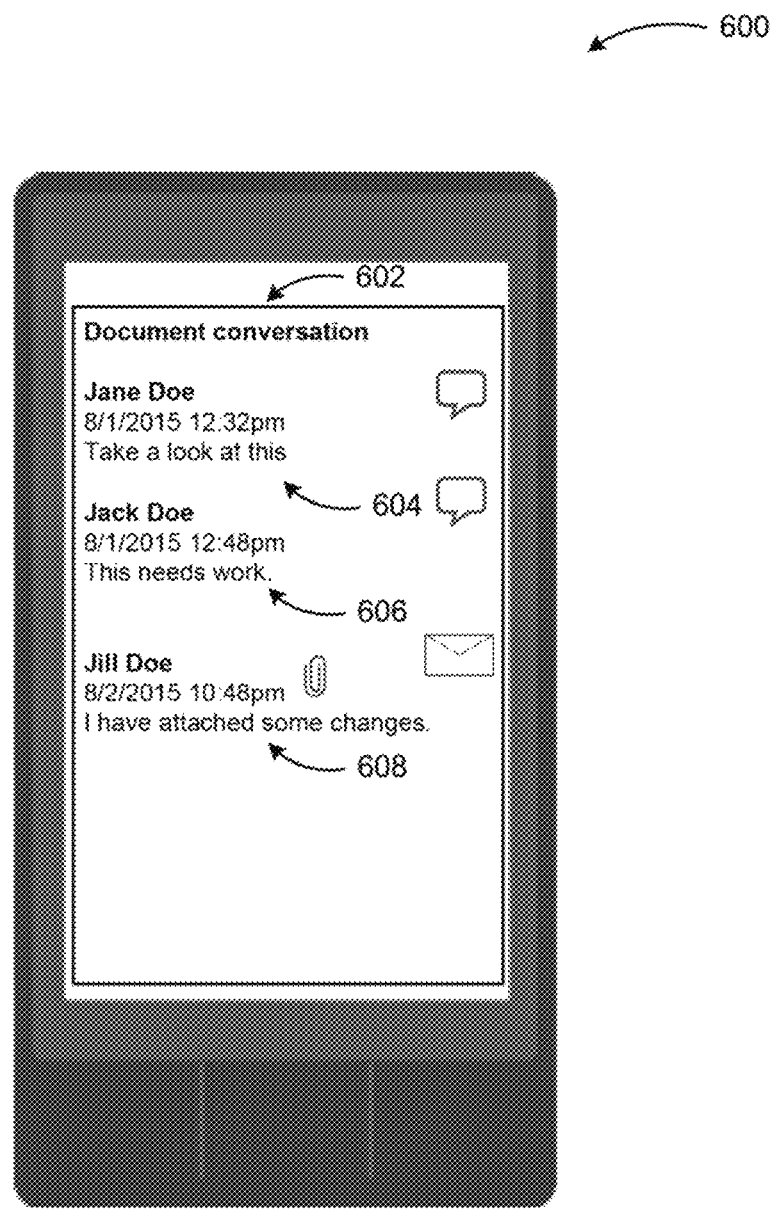
FIG. 6 illustrates presentation of shared comments related to a collaborative document.

FIG. 6 illustrates presentation of shared comments related to a collaborative document.

In addition to displaying aggregated comments and content through the user interface of a document authoring application, a system according to embodiments may also provide notifications or the entire aggregated comments through a communication application user interface. Diagram 600 shows an example communication application user interface on a mobile device, where the aggregated comments from collaborators 604, 606, and 608 may be displayed as a conversation 602 on the document. Each item may indicate the sender of the comment, date and time, content of the comment, a communication channel (application) that was used to send the comment, and other relevant information. For example, a collaborator may send an attachment to the others, which may be shown in the aggregated comments list. Other suitable information may also be displayed.

As discussed herein, a document authoring application and/or communication applications may be employed to perform operations associated with providing collaboration tools within a document editor. An increased user efficiency with the document authoring application may occur as a result of presentation of a collaboration card that allows exchange of comments and content in collaboration about a document. Allowing comments to be exchanged from within the document authoring application and through a variety of communication applications may reduce processor load, increase processing speed, conserve memory, and reduce network bandwidth usage.

Embodiments, as described herein, address a need that arises from a lack of efficiency between collaborators interacting with a document authoring application to work on a shared document. The actions/operations described herein are not a mere use of a computer, but address results that are direct consequences of software used as a service offered to large numbers of users and applications.

The example scenarios and schemas in FIG. 1 through 6 are shown with specific components, data types, and configurations. Embodiments are not limited to systems according to these example configurations. Providing collaboration card based comment sharing may be implemented in configurations employing fewer or additional components in applications and user interfaces. Furthermore, the example schema and components shown in FIG. 1 through 6 and their subcomponents may be implemented in a similar manner with other values using the principles described herein.

Figure 7:
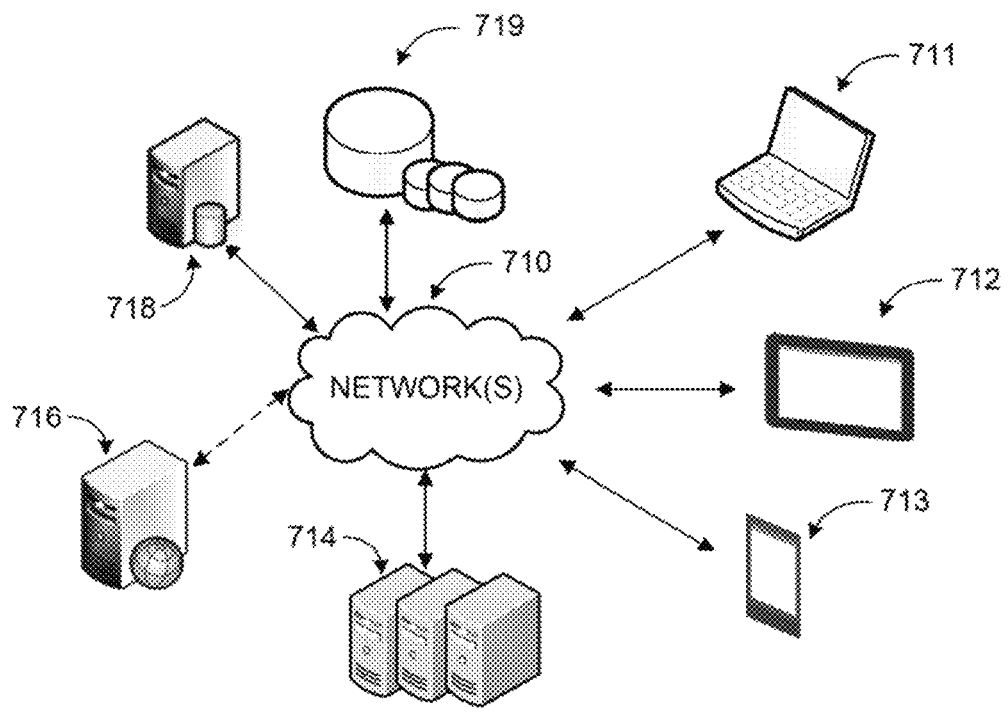
FIG. 7 is a simplified networked environment, where a system according to embodiments may be implemented.

FIG. 7 is an example networked environment, where embodiments may be implemented. A document authoring application configured to provide collaboration cards for exchange of comments and content among collaborators may be implemented via software executed over one or more servers 714 such as a hosted service. For example, the document authoring application may be part of a cloud-based productivity service and authored document and/or related conversations may be stored in the cloud. The platform may communicate with client applications on individual computing devices such as a smart phone 713, a mobile computer 712, or desktop computer 711 ('client devices') through network(s) 710.

Client applications executed on any of the client devices 711-713 may facilitate communications via application(s) executed by servers 714, and/or on individual server 716. Information associated with the authored document, related conversation, and associated data may be obtained from applications executed on client devices 711-713 or other devices. A document authoring application may allow collaborators to exchange comments and content associated with the document through different communication applications and the document authoring application. The document authoring application may store data associated with the document in data store(s) 719 directly and/or through database server 718.

Network(s) 710 may comprise any topology of servers, clients, Internet service providers, and communication media. A system according to embodiments may have a static and/or dynamic topology. Network(s) 710 may include secure networks such as an enterprise network, an unsecure network such as a wireless open network and/or the Internet. Network(s) 710 may also coordinate communication over other networks such as Public Switched Telephone Network (PSTN) and/or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to provide collaboration cards to facilitate communication and collaboration in conjunction with a document. Furthermore, the networked environments discussed in FIG. 7 are for illustration purposes only. Embodiments are not limited to the example applications, modules, or processes.

Figure 8:
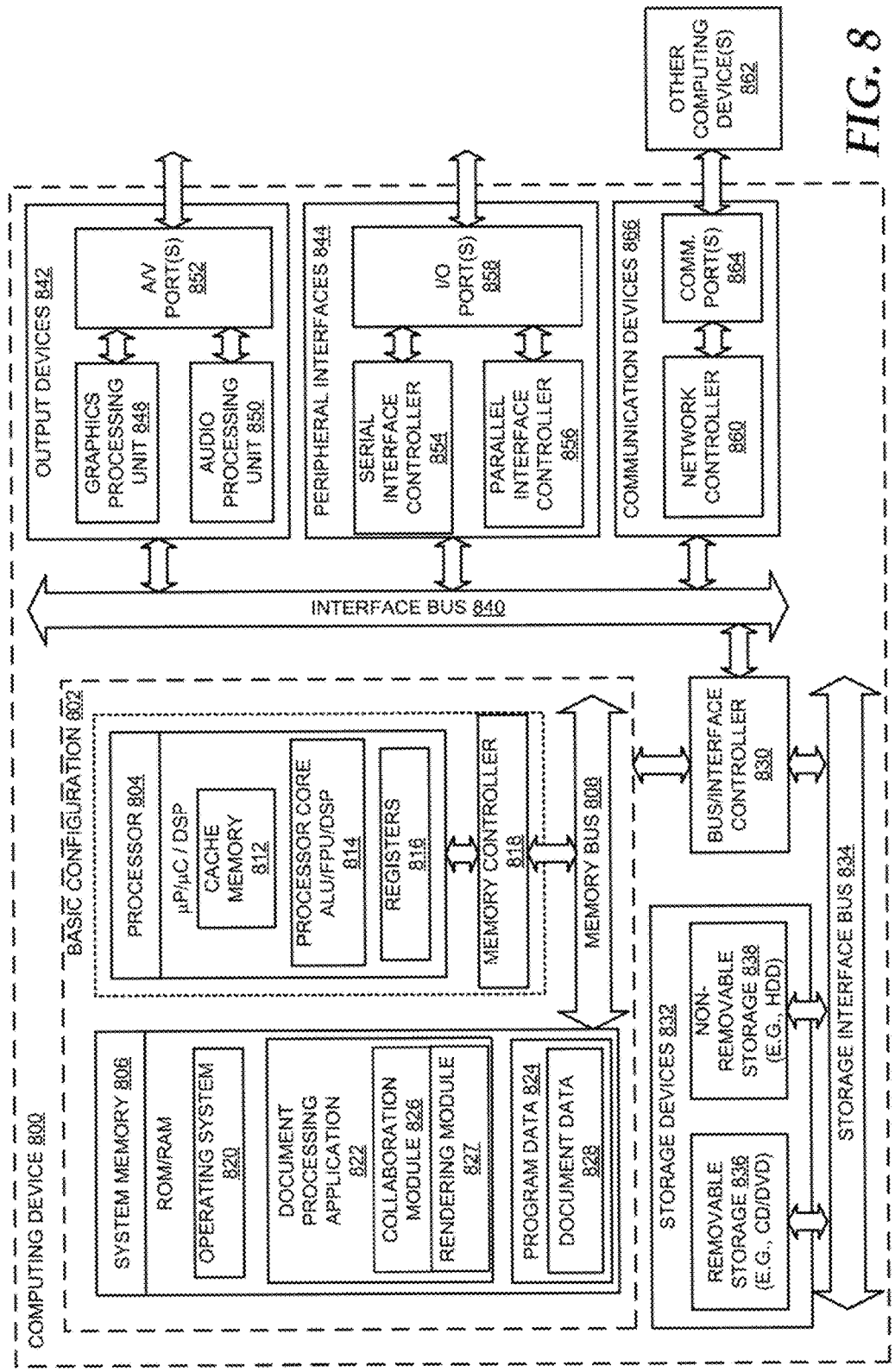
FIG. 8 is a block diagram of an example computing device, which may be used to provide collaboration cards to communicate in relation to a collaborative document.

FIG. 8 is a block diagram of an example computing device, which may be used to provide collaboration cards to facilitate communication and collaboration in conjunction with a document.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communication between the processor 804 and the system memory 806. The basic configuration 802 may be illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations, the memory controller 818 may be an internal part of the processor 804.

Depending on the desired configuration, the system memory 806 may be of any type including but not limited to volatile memory (such as RAM), non-volatile memory (such as ROM, flash memory, etc.), or any combination thereof. The system memory 806 may include an operating system 820, a document authoring application 822, and a program data 824. The document authoring application 822 may include a component such as a collaboration module 826 and a rendering module 827. The collaboration module 826 and the rendering module 827 may execute the processes associated with the document authoring application 822. The rendering module 827 may display a document and collaboration cards associated with the document. The collaboration module 826 may enable insertion of comments and content into the cards, selection of recipients to receive the cards, and communication channels for transmission of the cards.

Components of the document authoring application 822 (such as a user interface) may also be displayed on a display device associated with the computing device 800. An example of the display device may include a hardware screen that may be communicatively coupled to the computing device 800. The display device may include a touch based device that detects gestures such as a touch action. The display device may also provide feedback in response to detected gestures (or any other form of input) by transforming a user interface of the document authoring application 822, displayed by the touch based device. The program data 824 may also include, among other data, document data 828, or the like, as described herein. The document data 828 may include a document, and a conversation associated with the document, among others.

The computing device 800 may have additional features and/or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one of more peripheral interfaces 844, and one or more communication devices 846) to the basic configuration 102 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 866 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer, which includes any of the herein discussed functions. The computing device 800 may also be implemented as a personal computer including both laptop computer and non-laptop computer configurations.

Example embodiments may also include methods to provide collaboration cards to facilitate communication and collaboration in conjunction with a document. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
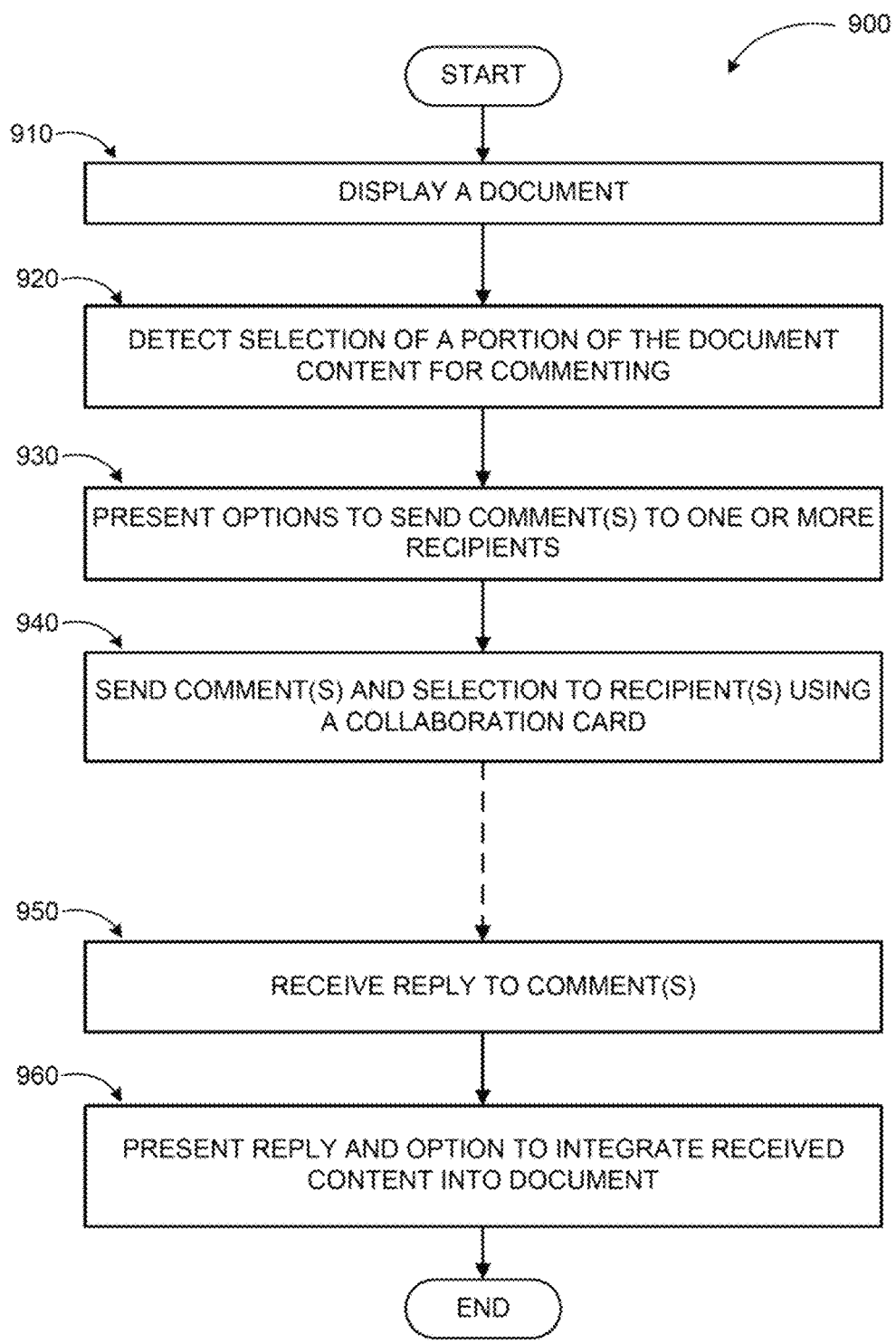
FIG. 9 is a logic flow diagram illustrating a process to provide collaboration cards to communicate in relation to a collaborative document, according to embodiments.

FIG. 9 illustrates a logic flow diagram for a process to provide a collaboration cards to facilitate communication and collaboration in conjunction with a document, according to embodiments. Process 900 may be implemented on a computing device such as the computing device 800 or other systems.

Process 900 begins with operation 910, where a document may be displayed on a user interface of a document authoring application. The document authoring application may detect selection of a portion of the document's content for commenting by a collaborator at operation 920. At operation 930, the user interface may display one or more options to enter a comment and send the comment to one or more recipients through a selected communication channel. In other embodiments, the commenting may begin by the initiating collaborator typing a special character at a location within the content of the document followed by a recipient name.

At operation 940, the entered comment(s) and context for the comment(s) (e.g., selected portion of the document's content) may be sent over the selected communication channel(s) to the recipient(s) using a collaboration card. If and when the initiating collaborator receives one or more replies to the sent comment(s) at operation 950, the replies may be aggregated and presented through the document authoring application user interface or through a communication application user interface along with an option to integrate the received content into the document's content at operation 960.

The operations included in process 900 are for illustration purposes. Providing collaboration cards to facilitate communication and collaboration in conjunction with a document may be implemented by similar processes with fewer or additional steps, as well as in different order of operations using the principles described herein.

According to examples, a means for providing collaborative authoring through collaboration cards is described. The means may include a means for presenting a document through a user interface of a document authoring application; a means for detecting an action for commenting on a portion of content within the document; a means for displaying an option to share a comment with a collaborator; a means for displaying one or more options to select a communication channel to share the comment; a means for sharing the comment with the collaborator through the selected communication channel in form of a collaboration card; and upon receiving a reply to the shared comment, a means for displaying the reply and an option to integrate received content into the content within the document.

According to some examples, a computing device to provide collaborative authoring through collaboration cards is described. The computing device may include a memory configured to store instructions associated with a document authoring application and one or more communication applications and one or more processors coupled to the memory, the one or more processors executing the document authoring application and the one or more communication applications in conjunction with the instructions stored in the memory. The document authoring application may include a rendering module configured to present a document and a collaboration module. The collaboration module may be configured to detect an action for commenting on a portion of content within the document; enable display of an option to share a comment with a collaborator through the rendering module; enable display of one or more options to select a communication channel to share the comment; and share the comment with the collaborator through the selected communication channel in form of a collaboration card.

According to other examples, the action for commenting may include insertion of a commenting tag or selection of a comment option associated with the portion of the content within the document. The collaboration module may be configured to share the comment in form of a collaboration card. The collaboration card may include the portion of the content, the comment, and information associated with an author of the comment. The collaboration module may be further configured to receive a reply to the shared comment and enable display of the received reply through the rendering module. The collaboration module may also be configured to enable display of the received reply through the one or more communication applications.

According to further examples, the collaboration module may be further configured to present an option to integrate content in the received reply through the rendering module. The collaboration module may also be configured to enable display of one or more prepared comments to be selected for sharing through the rendering module. The collaboration module may be further configured to present through the rendering module a context within the document associated with the shared comment through one or more of the document authoring application or the one or more communication applications. The context may include portions of the content within the document in a vicinity of the selected portion of the content within the document. The communication channel may include an email, a text message, a posting, or an online conference.

According to other examples, a method executed on a computing device to provide collaborative authoring through collaboration cards is described. The method may include presenting a document through a user interface of a document authoring application; detecting an action for commenting on a portion of content within the document; displaying an option to share a comment with a collaborator; displaying one or more options to select a communication channel to share the comment; sharing the comment with the collaborator through the selected communication channel in form of a collaboration card; and upon receiving a reply to the shared comment, displaying the reply and an option to integrate received content into the content within the document.

According to yet other examples, detecting the action for commenting may include detecting one of insertion of a commenting tag and selection of a comment option associated with the portion of the content within the document. Detecting the insertion of the commenting tag may include detecting typing of a special character within a textual portion of the content. The method may also include enabling one or more collaborators to create a plurality of collaboration cards while creating the document. The method may further include receiving the reply from a collaborator's communication application at the document authoring application. The method may also include aggregating shared comments and replies associated with the document; and forwarding the aggregated shared comments and replies to a communication application associated with one of the collaborator.

According to further examples, a computer-readable memory device with instructions stored thereon to provide collaborative authoring through collaboration cards is described. The instructions may include presenting a document through a user interface of a document authoring application; detecting an action for commenting on a portion of content within the document, where the action includes one of insertion of a commenting tag and selection of a comment option on the portion of the content within the document; displaying an option to share a comment with one or more collaborators; displaying options to select one or more communication channels to share the comment; sharing the comment with the one or more collaborators through the selected one or more communication channels in form of one or more collaboration cards; and upon receiving a reply to the shared comment, displaying the reply and an option to integrate received content into the content within the document.

According to some examples, the instructions may further include aggregating replies from the one or more collaborators in a collaboration card and displaying the aggregated replies through the user interface of the document authoring application or through a user interface of a communication application associated with the selected one or more communication channels.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide collaborative authoring through collaboration cards, the computing device comprising:
   a memory configured to store instructions associated with a document authoring application and one or more communication applications;
   one or more processors coupled to the memory, the one or more processors executing the document authoring application and the one or more communication applications in conjunction with the instructions stored in the memory, wherein the one or more processors are configured to:
   present a document through a user interface of the document authoring application;
   detect an action for commenting on a portion of content within the document;
   display a commenting control through which input associated with a comment is received, wherein the commenting control provides options for input of content of the comment and a collaborator with whom to share the comment;
   generate a collaboration card for display within the document based on the input;
   transmit the collaboration card to the collaborator to share the comment with the collaborator; and
   upon receiving a reply to the shared comment from the collaborator, display, in the collaboration card within the document, the reply and an option to integrate suggested content provided in the reply into the portion of the content within the document.

2. The computing device of claim 1, wherein the action for commenting includes one of insertion of a commenting tag and selection of a comment option associated with the portion of the content within the document.

3. The computing device of claim 1 wherein the collaboration card includes the portion of the content, the comment, and information associated with an author of the comment.

4. The computing device of claim 1 wherein the one or more processors are configured to:
display the reply in the collaboration card within the document through the one or more communication applications.

5. The computing device of claim 1, wherein the commenting control provides options for selection of
one or more prepared comments.

6. The computing device of claim 1, wherein the one or more processors are further configured to:
present a context within the document associated with the shared comment through one or more of the document authoring application or the one or more communication applications.

7. The computing device of claim 6, wherein the context includes portions of the content within the document in a vicinity of the portion of the content within the document on which the action for commenting was detected.

8. The computing device of claim 1, wherein the commenting control provides options for selection of a communication channel to share the comment through, and the communication channel includes one of an email, a text message, a posting, and an online conference.

9. A method executed on a computing device to provide collaborative authoring through collaboration cards, the method comprising:
presenting a document through a user interface of a document authoring application;
detecting an action for commenting on a portion of content within the document;
displaying a commenting control through which input associated with a comment is received, wherein the commenting control provides options for input of content of the comment and a collaborator with whom to share the comment;
generating a collaboration card for display within the document based on the input;
transmitting the collaboration card to the collaborator to share the comment with the collaborator; and
upon receiving a reply to the shared comment from the collaborator, displaying, in the collaboration card within the document, the reply and an option to integrate suggested content provided in the reply into the portion of the content within the document.

10. The method of claim 9, wherein detecting the action for commenting comprises:
detecting one of insertion of a commenting tag and selection of a comment option associated with the portion of the content within the document.

11. The method of claim 10, wherein detecting the insertion of the commenting tag comprises:
detecting typing of a special character within a textual portion of the content.

12. The method of claim 9, further comprising:
enabling one or more collaborators to create a plurality of collaboration cards while creating the document.

13. The method of claim 9, further comprising:
receiving the reply from a communication application of the collaborator at the document authoring application.

14. The method of claim 9, further comprising:
aggregating shared comments and replies associated with the document; and
forwarding the aggregated shared comments and replies to a communication application associated with one or more collaborators.

15. A computer-readable memory device with instructions stored thereon to provide collaborative authoring through collaboration cards, the instructions comprising:
presenting a document through a user interface of a document authoring application;
detecting an action for commenting on a portion of content within the document, wherein the action includes one of insertion of a commenting tag and selection of a comment option on the portion of the content within the document;
displaying a commenting control through which input associated with a comment is received, wherein the commenting control provides options for input of content of the comment and a collaborator with whom to share the comment;
generating a collaboration card for display within the document based on the input;
transmitting the collaboration card to the collaborator to share the comment with the collaborator; and
upon receiving a reply to the shared comment from the collaborator, displaying, in the collaboration card within the document, the reply and an option to integrate suggested content provided in the reply into the portion of the content within the document.

16. The computer-readable memory device of claim 15, wherein the instructions further comprise:
aggregating replies from the collaborator in the collaboration card.

17. The computer-readable memory device of claim 16, wherein the instructions further comprise:
displaying the aggregated replies through the user interface of the document authoring application or through a user interface of a communication application associated with a communication channel selected to transmit the collaboration card through.

* * * * *